United States Patent
Wojciechowski et al.

(10) Patent No.: US 7,124,492 B2
(45) Date of Patent: *Oct. 24, 2006

(54) FASTENER, METHOD OF ATTACHING A FASTENER TO A PANEL AND FASTENER AND PANEL ASSEMBLY

(75) Inventors: Stanley E. Wojciechowski, Lancaster, CA (US); Michael J. McShane, Bloomfield Hills, MI (US); John M. Parker, Ann Arbor, MI (US); David H. Shuart, Royal Oak, MI (US)

(73) Assignee: Whitesell International Corporation, Taylor, MI (US)

( * ) Notice: Subject to any disclaimer, the term of this patent is extended or adjusted under 35 U.S.C. 154(b) by 160 days.

This patent is subject to a terminal disclaimer.

(21) Appl. No.: 10/641,566

(22) Filed: Aug. 13, 2003

(65) Prior Publication Data

US 2004/0031551 A1 Feb. 19, 2004

Related U.S. Application Data

(60) Continuation-in-part of application No. 10/245,938, filed on Sep. 18, 2002, now Pat. No. 6,647,608, which is a division of application No. 09/909,260, filed on Jul. 19, 2001, now Pat. No. 6,592,311.

(51) Int. Cl.
  *B21D 39/00* (2006.01)
  *B23P 11/00* (2006.01)
(52) U.S. Cl. ............................. 29/515; 29/509; 29/521; 29/522.1

(58) Field of Classification Search .................. 29/515, 29/509, 521, 522.1; 411/180, 181
See application file for complete search history.

(56) References Cited

U.S. PATENT DOCUMENTS

| 1,114,013 | A | | 10/1914 | Millar |
| 2,486,769 | A | * | 11/1949 | Watson, Jr. .................. 411/180 |
| 2,741,289 | A | | 4/1956 | Grow ........................... 151/37 |
| 2,972,730 | A | | 2/1961 | Abrams ....................... 339/221 |
| 3,058,211 | A | | 10/1962 | Axtell .......................... 29/509 |
| 3,125,146 | A | * | 3/1964 | Rosan .......................... 411/180 |
| 3,127,919 | A | | 4/1964 | Swanstrom .............. 151/41.73 |
| 3,133,579 | A | * | 5/1964 | Grimm et al. |

(Continued)

FOREIGN PATENT DOCUMENTS

CA 2501754 * 9/2000

(Continued)

OTHER PUBLICATIONS

PCT/US04/26259 International Search Report dated Oct. 28, 2005.

*Primary Examiner*—Eric Compton
(74) *Attorney, Agent, or Firm*—Howard & Howard

(57) ABSTRACT

A fastener element including a barrel portion, a first radial flange portion integral and coaxially aligned with the barrel portion and a second radial flange portion having a diameter greater than the first radial flange portion coaxially aligned with the first radial flange portion including an annular face having circumferentially spaced radial ribs and a method of installing the fastener element which includes forming an opening in a panel which receives the barrel and first radial flange portions, wherein the panel is deformed radially inwardly against the first radial flange portion and the first radial flange portion is preferably deformed radially outwardly forming a secure fastener and panel assembly.

11 Claims, 6 Drawing Sheets

U.S. PATENT DOCUMENTS

| | | | |
|---|---|---|---|
| 3,187,796 A * | 6/1965 | Double | |
| 3,299,500 A | 1/1967 | Double | 29/432.2 |
| 3,367,685 A | 2/1968 | Church et al. | 287/20.3 |
| 3,535,678 A | 10/1970 | Gulistan | 339/276 |
| 3,820,579 A | 6/1974 | Barry | 151/41.73 |
| 3,878,598 A * | 4/1975 | Steward | |
| 3,910,331 A * | 10/1975 | Randall | |
| 4,223,585 A * | 9/1980 | Barth et al. | |
| 4,402,124 A * | 9/1983 | Krueger | |
| 4,543,023 A | 9/1985 | Capuano | 411/180 |
| 4,940,375 A * | 7/1990 | Marvell et al. | 411/181 |
| 5,251,370 A | 10/1993 | Muller et al. | 29/512 |
| 5,423,645 A | 6/1995 | Muller et al. | 411/181 |
| 5,489,176 A * | 2/1996 | Fultz | |
| 5,513,933 A | 5/1996 | Rom | 411/180 |
| 5,528,812 A * | 6/1996 | Muller | 29/432.2 |
| 5,613,815 A * | 3/1997 | Muller | |
| 5,644,830 A | 7/1997 | Ladouceur et al. | 29/432.2 |
| 6,125,524 A | 10/2000 | Mueller | 29/520 |
| 6,647,608 B1 * | 11/2003 | Wojciechowski et al. | 29/515 |
| 2005/0025610 A1 * | 2/2005 | Vrana et al. | 411/353 |

FOREIGN PATENT DOCUMENTS

JP  09-151927  *  6/1987

* cited by examiner

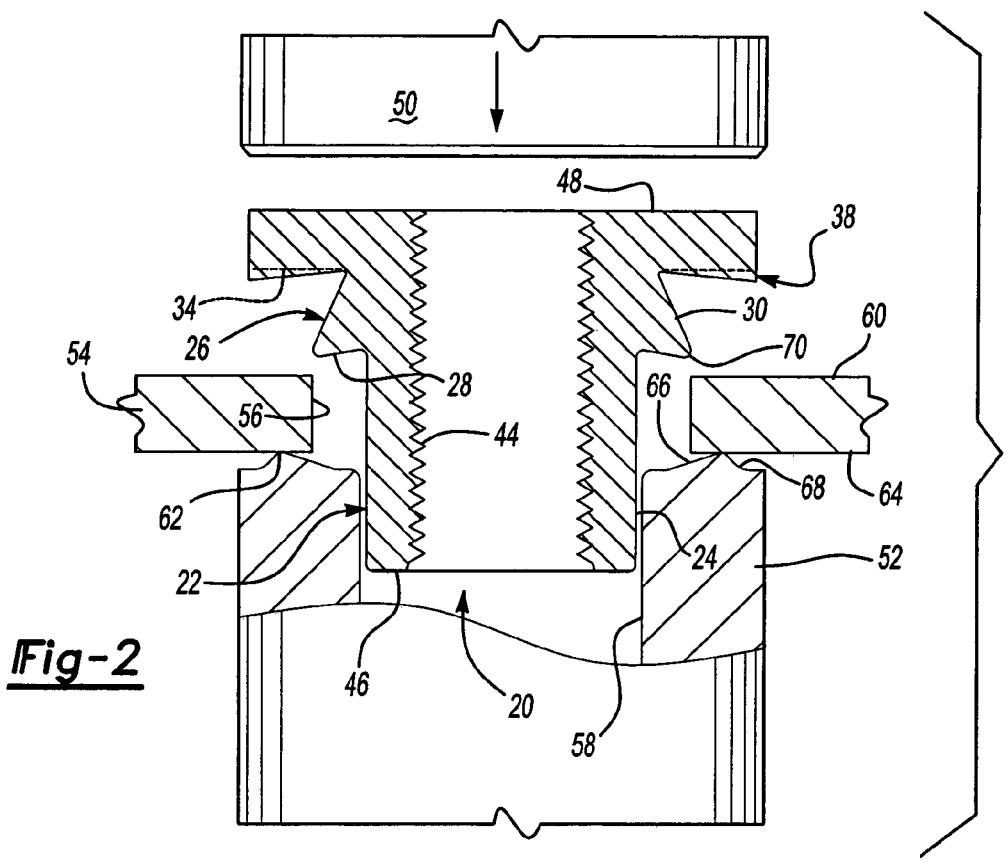
_Fig-2_
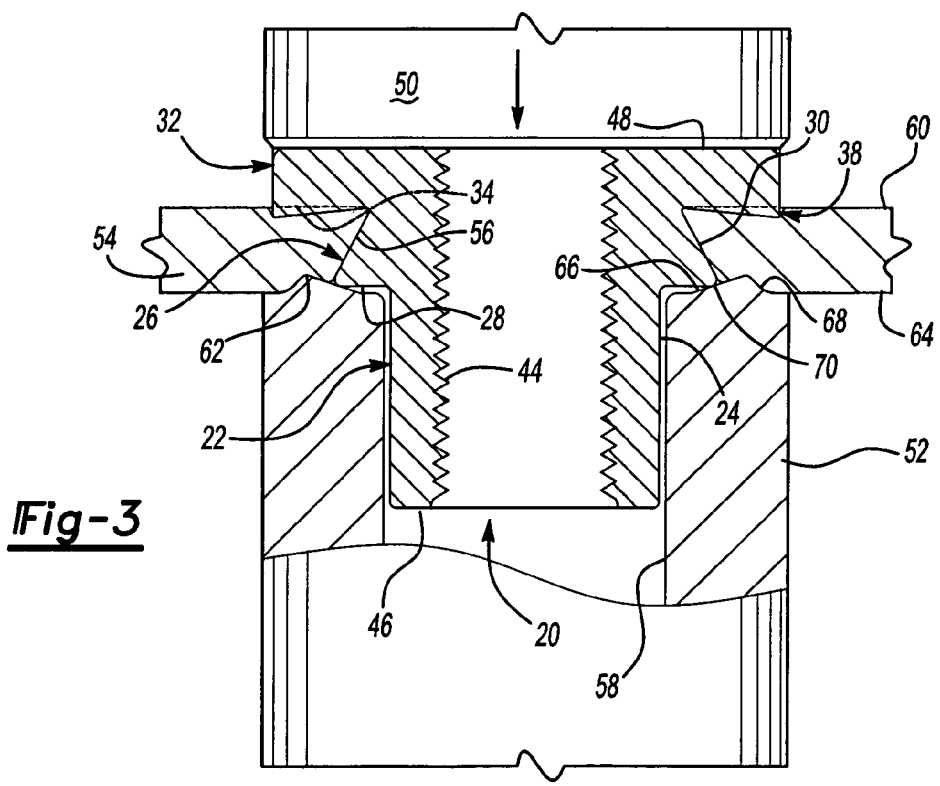
_Fig-3_

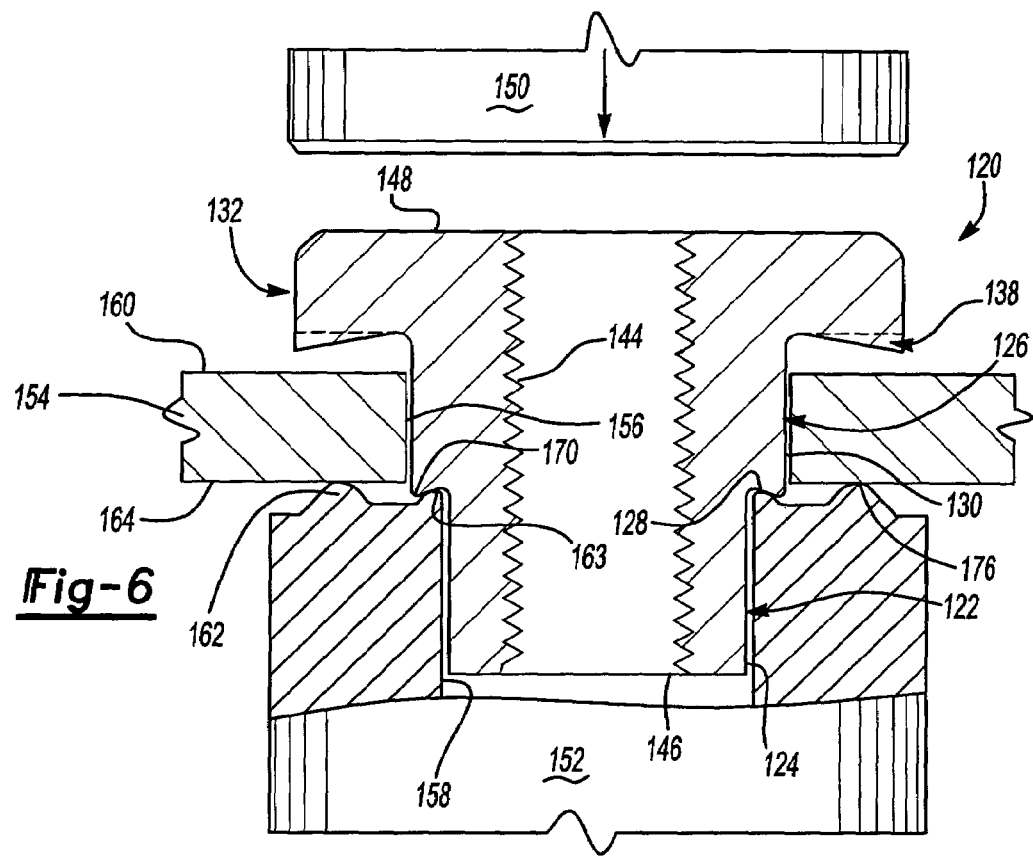
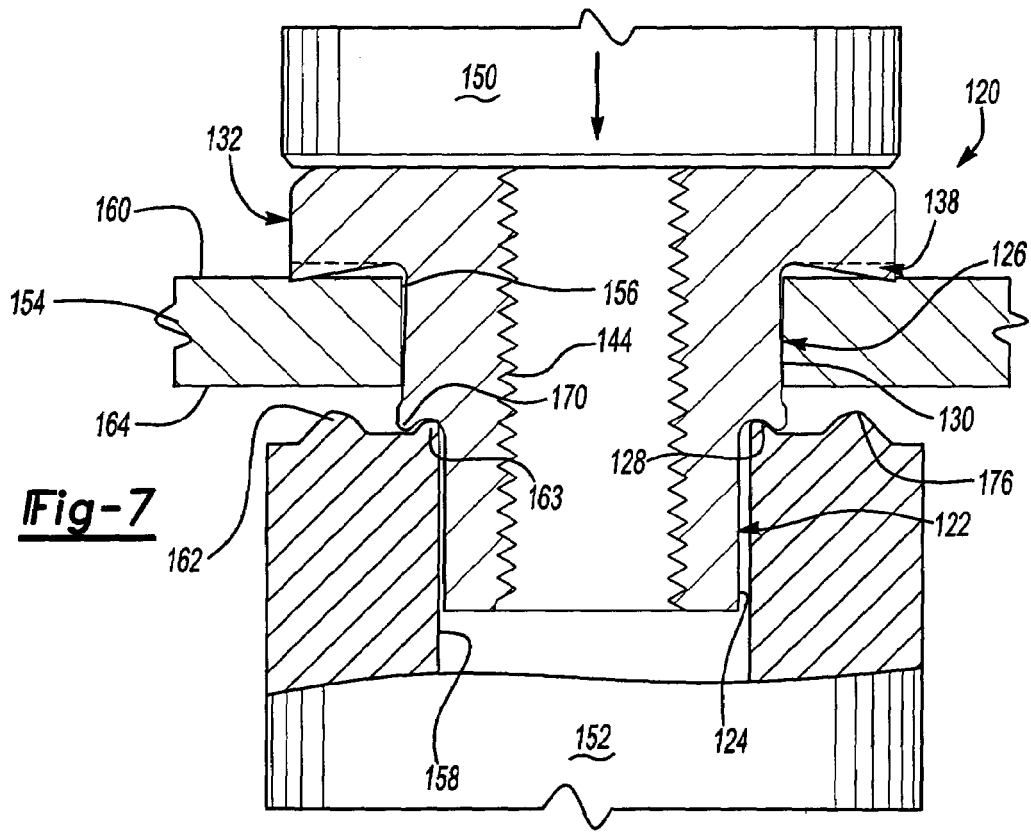

FASTENER, METHOD OF ATTACHING A FASTENER TO A PANEL AND FASTENER AND PANEL ASSEMBLY

RELATED APPLICATIONS

This application is a continuation-in-part application of Ser. No. 10/245,938 filed Sep. 18, 2002 now U.S. Pat. No. 6,747,608, which application is a divisional application of Ser. No. 09/909,260 filed Jul. 19, 2001 now U.S. Pat. No. 6,592,311.

FIELD OF THE INVENTION

This invention relates to a fastener or fastening element, particularly but not exclusively a female fastener, a method of attaching a fastener element to a panel and a fastener and panel assembly.

BACKGROUND OF THE INVENTION

Fasteners or fastening elements of the general type disclosed herein are typically attached to a panel to attach a second element to the same panel. As used herein, the term "panel" may be any metal plate-like member, such as a bracket, frame member or the like as used, for example, by the automotive and appliance industries. Following attachment of the fastener to the panel, the fastener is then utilized to attach a second element to the panel. For example only, the panel may be a frame member and the fastener may be utilized following installation in the frame member to attach a bracket or component to the frame member.

In mass production applications, self-attaching fasteners are typically installed in a panel in a die press, wherein the lower die member or die platen includes a die member or die button which supports the panel during installation and the upper die member or die platen includes a plunger which drives the fastener into the panel and the panel and/or the fastener is deformed to secure the fastener on the panel. In light metal applications, wherein the panel has a thickness of less than about 0.050 inches, the fastener may be utilized as a punch, wherein the fastener pierces an opening in the panel and the fastener is then installed in the pierced panel opening. These types of fasteners are commonly referred to as self-attaching fasteners and include pierce nuts which were invented by the predecessor in interest of the Assignee of this application over 50 years ago.

In applications requiring a thicker panel, an opening must first be formed in the panel and the fastener is then installed in the panel opening. However, thick metal applications may also require greater fastener and panel assembly joint integrity, including greater push-off strength and torque resistance. It would also be desirable to utilize the same method of installation and installation tooling for a male or female fasteners depending upon the application for the fastener, thereby increasing the applications for the fastener and the tooling. The fastener element, method of attaching a fastener element to a panel and fastener and panel assembly of this invention achieve these objects in a relatively simple fastener element which may be formed by conventional cold heading techniques.

SUMMARY OF THE INVENTION

The fastener element of this invention includes a generally cylindrical shank or barrel portion, a first radial flange portion integral and coaxially aligned with the shank or barrel portion having a diameter greater than the shank or barrel portion and a second radial flange portion integral and coaxially aligned with the first radial flange portion having a diameter greater than the first radial flange portion. In the embodiment of the fastener elements disclosed in this application, the shank or barrel portion and the first and second coaxially aligned radial flange portions include a bore therethrough which may be internally threaded to form a female fastener element. However, the shank or barrel portion may alternately be externally threaded to form a male fastener element. In a preferred embodiment of the fastener element of this invention, the second radial flange portion includes an annular face adjacent the first radial flange portion including at least one or more preferably a plurality of ribs projecting from the annular surface preventing rotation of the fastener element following installation in a panel. In the disclosed embodiment, the annular face of the second radial flange portion includes a plurality of radial ribs which are polygonal in cross-section having a top face which is inclined radially outwardly from adjacent the first radial flange portion to the outer surface of the second radial flange portion, wherein the opposed side faces of the radial ribs are inclined outwardly from the top face. However, other anti-rotation ribs may also be utilized.

Further, in the disclosed embodiment of the fastener element of this invention, the first radial flange portion also includes an annular face surrounding the shank or barrel portion which, in the disclosed embodiments of the fastener element of this invention, is inclined radially outwardly from the shank or barrel portion to the outer edge of the annular end face. In one disclosed embodiment of the fastener element of this invention, the outer annular face of the first radial flange portion overlies the annular end face of the second radial flange portion which, in the disclosed embodiment, is frustoconical having a minor diameter at the annular end face of the second radial flange portion. In a second embodiment of the fastener element of this invention, the outer surface of the first radial flange portion is cylindrical.

The method of attaching a fastener element of this invention includes forming an opening in the panel having a diameter at least equal to the diameter of the first radial flange portion and less than the diameter of the second radial flange portion. In one preferred embodiment, the inside diameter of the opening formed in the panel is generally equal to or just slightly greater than the outer diameter of the first radial flange portion. The method of this invention then includes inserting the shank or barrel portion and the first radial flange portion of the fastener element through the opening in the panel, such that the annular face of the second radial flange portion which includes the anti-rotation rib or ribs is opposite one face of the panel. The method of this invention then includes driving the annular end face of the second radial flange portion against the panel adjacent the panel opening, thereby deforming the rib or ribs projecting from the annular end face into the one face of the panel. Where the annular face of the second radial flange portion are circumferentially spaced and radially inclined, as described above, the ribs are sequentially or incrementally driven into the panel, starting with the radial outer ends of the ribs, and moving progressively inwardly as the ribs are driven into the panel, assuring full deformation of the ribs into the panel and improved torque resistance.

The panel adjacent the panel opening is preferably simultaneously driven radially inwardly toward the outer surface of the first radial flange portion. Where the outer surface of the first radial flange portion overlies the annular face of the first radial flange portion as described above, the panel is driven beneath the overlying surface, forming a secure installation. In a preferred embodiment of the method of attaching a fastening element to a panel of this invention, the outer portion of the first radial flange portion is simultaneously deformed radially outwardly and against the panel adjacent the panel opening as the panel is driven radially inwardly forming a more secure assembly having greater push-off strength.

In one preferred embodiment, the method of this invention includes driving a die member having a first inner annular die surface configured to be received against the annular surface of the first radial flange portion and a second outer annular die surface opposite the panel overlying the annular face of the second radial flange portion. The die member is then driven toward the panel, wherein the first inner annular die surface engages the annular face of the first radial flange portion and deforms the annular face radially outwardly to overly the panel adjacent the panel opening. As the die member is driven toward the panel, the second outer annular die surface engages the panel and drives the panel radially inwardly and finally the first inner annular die surface drives an outer portion of the first radial flange portion against the panel forming a very secure installation. In both of the disclosed embodiments of the method of installing a fastener element in a panel, the second radial flange portion is deformed radially outwardly. However, in the first disclosed embodiment of the method of this invention, the annular die surface is generally V-shaped, wherein the inner surface is inclined at an angle less than the outer surface and engages the outer surface of the second radial flange portion and deforms the second radial flange portion radially outwardly as the panel is driven radially inwardly to improve retention of the fastener element in the panel opening.

The fastener and panel assembly of this invention thus includes a panel having an opening therethrough, a fastener element, as described above, having a shank or barrel portion and first and second radial flange portions, wherein the shank or barrel portion and the first radial flange portion extends through the opening in the panel, the annular face of the second radial flange portion engages one face of the panel with the radial ribs deformed into the one face of the panel to prevent rotation of the fastener element relative to the panel. The first radial flange portion includes a radial portion overlying an opposed face of the panel and is preferably deformed against the opposed face of the panel with the panel deformed radially inwardly against an outer surface of the first radial flange portion and beneath the portion of the first radial flange portion overlying the annular face of the second radial flange portion. In one preferred embodiment, the radial portion of the first radial flange portion includes an annular recess and the second face of the panel also includes an annular recess surrounding the radial portion of the first radial flange portion. The annular face of the second radial flange portion preferably includes a plurality of circumferentially spaced radial ribs each having a top face inclined radially outwardly from the first radial flange portion which are deformed into the one face of the panel. In the disclosed embodiment, as described above, the radial ribs are generally trapezoidal in cross-section, each having opposed side faces which are inclined outwardly from the top face of the radial ribs and the panel is deformed by the inclined side faces against the annular face of the second radial flange portion.

Further advantages and meritorious features of the fastener element and method of attaching a fastening element to a panel will be understood from the following description of the preferred embodiments, the appended claims and the drawings, a brief description of which follows.

BRIEF DESCRIPTION OF THE DRAWINGS

FIG. 2 is a side partially cross-sectioned view of the embodiment of the fastener element shown in FIG. 1 with the fastener element and a panel in a die assembly ready for installation;

FIG. 3 is a side partially cross-sectioned view of FIG. 2 following installation of the fastener element in a panel;

FIG. 6 is a partially side cross-sectioned view of the fastener element illustrated in FIG. 4 with a panel in a die assembly ready for installation; and FIGS. 7 to 10 illustrate the sequence of the installation of the fastener element in a panel with the die assembly illustrated in FIG. 6.

DESCRIPTION OF THE PREFERRED EMBODIMENTS

Figure 1:
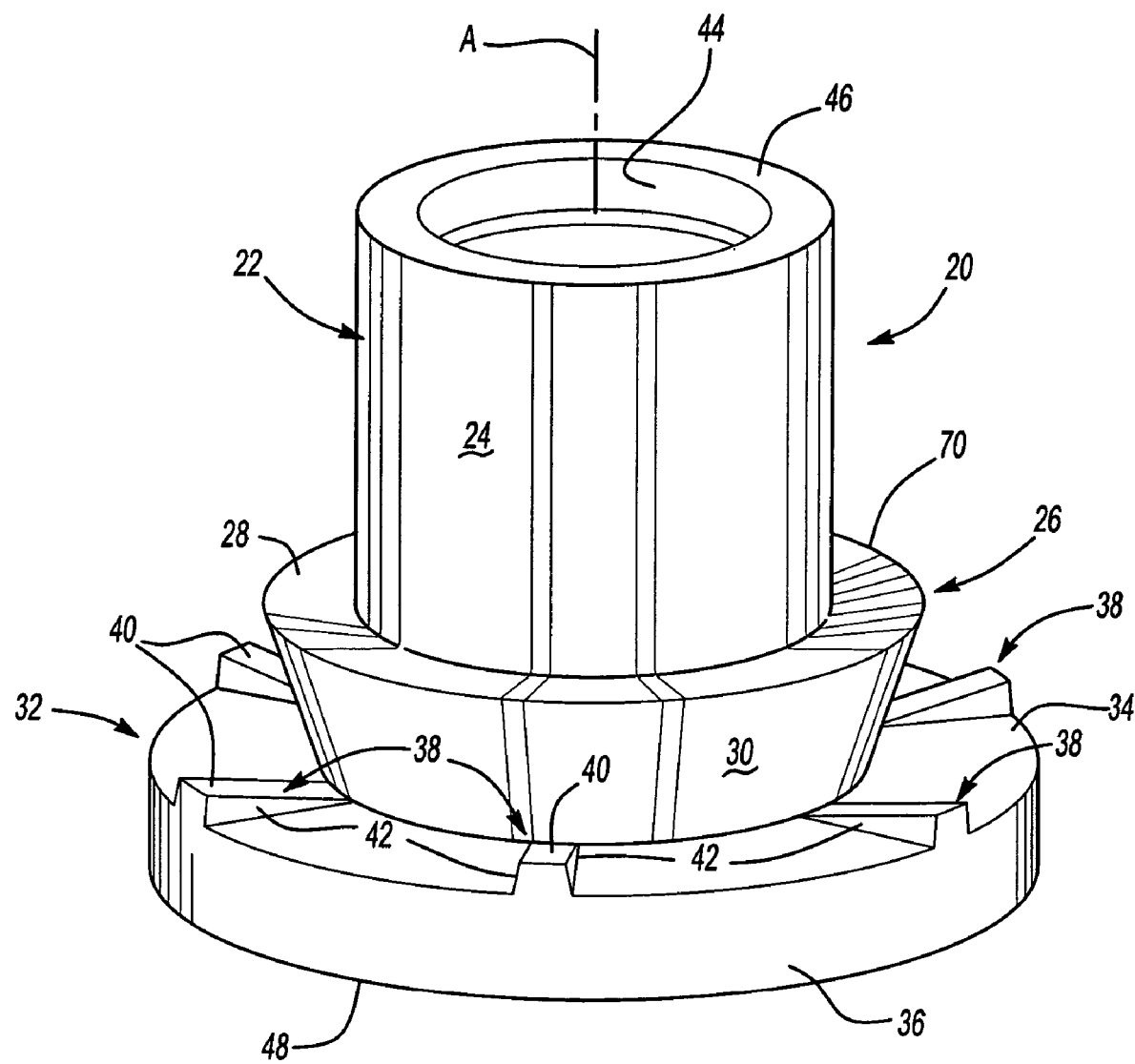
FIG. 1 is a side perspective view of one embodiment of the fastening element of this invention.

The embodiment of the fastener element 20 illustrated in FIG. 1 includes a shank or barrel portion 22 which, in the disclosed embodiment, includes a cylindrical outer surface 24. However, the shank or barrel portion 22 may have any suitable shape or may be externally threaded if the fastener element is to be utilized as a male fastener element. The fastener element 20 further includes a first radial flange portion 26 which, in the preferred embodiment, is integral and coaxially aligned with the shank or barrel portion 24. That is, the shank or barrel portion has a longitudinal axis A, as shown in FIG. 1, and the first radial flange portion is coaxially aligned with the longitudinal axis A of the shank or barrel portion 22. The first radial flange portion 26 includes an annular face 28 surrounding the shank or barrel portion 22 which, in the disclosed embodiment is dish-shaped or frustoconical having a minor diameter at the shank or barrel portion 22 and the first radial flange portion 26 further includes an outer surface 30 which, in this embodiment, preferably overlies the second radial flange portion 32 as shown. In the disclosed embodiment, the outer surface 30 is frustoconical having a minor diameter at the second radial flange portion 32. However, the outer surface 30 of the first radial flange portion 26 may have various shapes dependent upon the application of the fastener element and the method of installation described below.

The second radial flange portion 32 is integral and coaxially aligned with the first radial flange portion 26 and includes an annular end face 34 surrounding the first radial flange portion 26. The second radial flange portion 32 includes an annular face 34 which surrounds the first radial flange portion 26 and may be generally planar as shown. The annular face 34 in the disclosed embodiment includes a plurality of circumferentially spaced radial ribs 38, each having a top face 40 spaced above the plane of the annular face 30. In one preferred embodiment, the top face 40 of each of the radial ribs 38 is inclined radially outwardly from the first radial flange portion 26 to the outer surface 36 of the second radial flange portion 32. However, as set forth above, the annular face 34 may include only one rib, but preferably includes a plurality of circumferentially spaced radial ribs 38 as shown in FIG. 1 providing superior torque resistance of the fastener when installed in a panel as described below. The ribs 38 further include opposed side faces 42 which, in the disclosed embodiment, are inclined outwardly from the top face 40 to the annular face 34 of the second radial flange portion, such that the ribs are trapezoidal in crosssection as shown in FIG. 1.

As set forth above, the fastener element 20 may be utilized as a female fastener element, wherein the fastener element includes an axial bore 44 which extends through the shank or barrel portion 22 and the first and second radial flange portions 26 and 32, respectively. The bore 44 may be internally threaded as shown or the bore may be smooth and cylindrical to receive a self-threading or thread rolling male fastener. Alternatively, the shank or barrel portion 22 may be externally threaded as described above. Where the shank or barrel portion 22 includes an axial bore 44, the end face 46 is annular and preferably planar. The opposed end face 48 of the second radial flange portion 32 is also preferably planar to receive a plunger during the installation of the fastener element 20 in a panel as shown in FIGS. 2 and 3 described below.

As set forth above, the preferred embodiments of the fastener element of this invention may be installed in a conventional die press, wherein a fastener element is installed in a panel with each stroke of the die press. The installation apparatus includes an installation head (not shown) typically installed in the upper die member or die platen of the die press, which includes a reciprocating plunger 50, which reciprocated relative to the lower die member, and the lower die member or die platen includes a die member or "die button" 52 as shown in FIGS. 2 and 3. As will be understood by those skilled in this art, however, the orientation of the plunger 50 and die button 52 may be reversed, wherein the die button 52 is located on the upper die shoe.

The first step in the installation of the fastener 20 in a panel 54 is to form an opening 56 in the panel 54. The diameter of the opening 56 in the panel 54 is preferably generally equal to or slightly larger than the maximum diameter of the first radial flange portion 26 as shown in FIG. 2. The panel 54 is then received on and generally secured to the die button 52 which includes a cylindrical opening 58 having an internal diameter sufficient to receive the shank or barrel portion 22 of the fastener 20 as shown in FIG. 2. The fastener element 20 is then aligned with the opening 58 through the die button 52 opposite the plunger 50 and the shank or barrel portion 22 and the first radial flange portion 26 are received through the panel opening 56 such that the annular face 28 of the first radial flange portion 26 and the radial ribs 38 are located opposite one face or a first face 60 of the panel 54 as shown in FIG. 2. Where the fastener element 20 is installed in a panel 54 in a die press, the die press will include an installation head (not shown) which receives the fastener elements 20 having a reciprocating plunger 50 which drives the fastener element 20 toward the panel 54 and the opposed die member or die platen (not shown) includes a die button 52 and the panel 54 is supported on the die button with the panel opening 56 coaxially aligned with the opening 58 in the die button. As shown in FIG. 2, the die button 52 also includes an annular die surface or die lip 62 opposite an opposed or second face 64 of the panel 54. The die lip 62 includes a first inner inclined annular surface 66 and a second outer inclined annular surface 68, wherein the second outer inclined annular surface 68 has a steeper ramp angle or angle of inclination than the first inner inclined annular surface 66 and the first inner inclined annular surface 66 is also located opposite a radial outer annular edge 70 of the annular face 28 of the first radial flange portion 26.

Upon closing the die press, the plunger 50 drives the circumferentially spaced radial ribs 38 into the first face 60 of the panel and substantially simultaneously the die lip 62 is driven into the second face 64 of the panel 54, deforming the panel adjacent the opening 56 radially inwardly beneath the inclined frustoconical face 30 of the first radial flange portion 26 as shown in FIG. 3. The outer annular edge 70 of the first radial flange portion 26 is simultaneously driven against the first inner inclined annular surface 66 of the annular die lip 62, deforming the first radial flange portion 26 radially outwardly as the panel 54 adjacent the panel opening 56 is deformed radially inwardly, forming a secure mechanical interlock between the, fastener element 20 and the panel 54 and wherein the circumferentially spaced radial ribs 38 prevent rotation of the fastener element 20 relative to the panel 54. As will be understood, the inclined top face 40 of the radial ribs 38 will be incrementally driven into the face 60 of the panel 54 starting with the outer annular edge 70 assuring full deformation of the panel around the ribs 38. Further, the outwardly inclined outer side faces 42 of the ribs 38, shown in FIG. 1, direct the panel around the ribs against the annular face 34 of the second radial flange portion 32. The side faces 42 of the ribs are preferably inclined relative to the top face 40 at a relatively steep angle, preferably between about 70 and 85 degrees, to provide optimum torque resistance, wherein the side surfaces 42 are angled relative to the top surface 40 at about 80 degrees in the disclosed embodiment.

Figure 4:
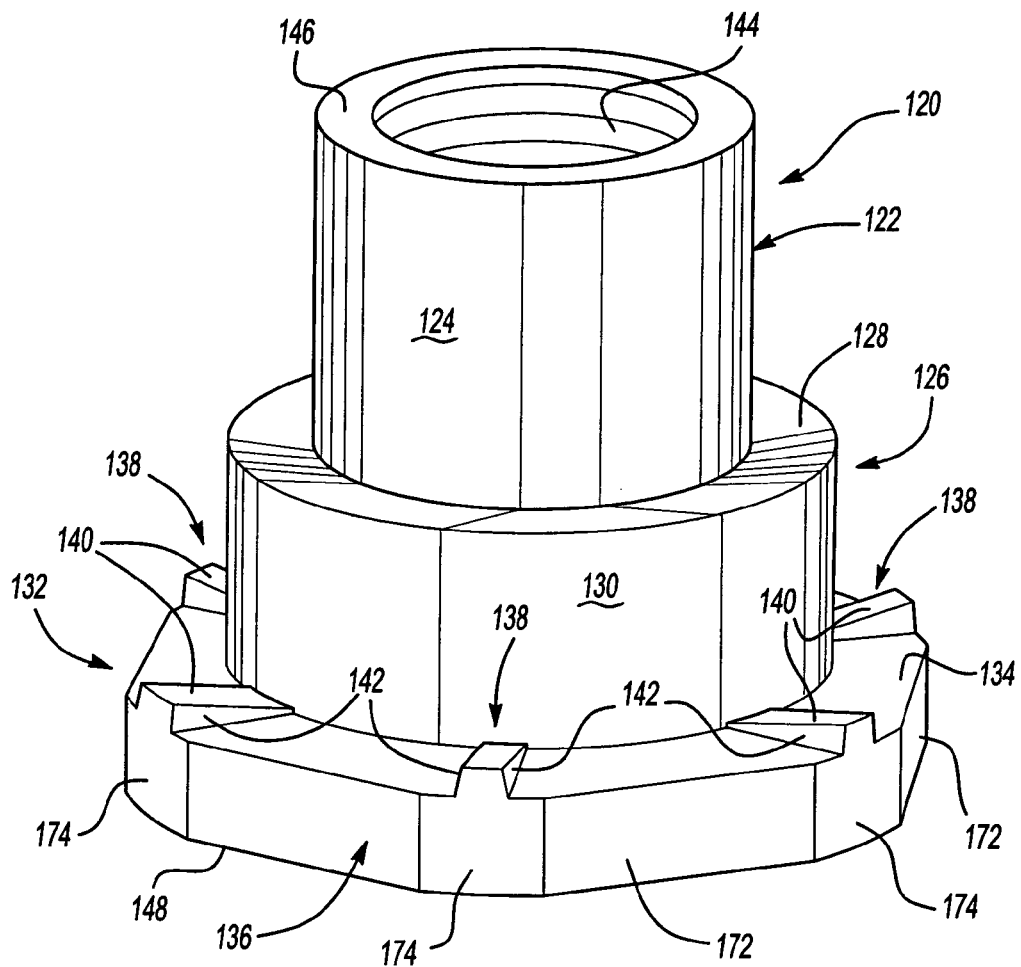
FIG. 4 is a side perspective view of an alternative embodiment of the fastener element of this invention.

FIG. 4 illustrates an alternative embodiment of the fastener element 120 of this invention which is similar, but not identical to the fastener element 20 illustrated in FIGS. 1 to 3. For ease of reference and to reduce the disclosure, the fastener element 120 illustrated in FIG. 4 is numbered in the same sequence as the fastener element 20 illustrated in FIG. 1, except that the fastener element 120 is numbered in the 100 series. That is, the fastener element 20 includes a shank or barrel portion 122 having a cylindrical outer surface 124, a first radial flange portion 126 including an annular face 128 surrounding the barrel or shank portion 122 and an outer surface 130. As will be noted from FIG. 4, however, the outer surface 130 of the first radial flange portion 126 of the fastener 120 illustrated in FIG. 4 is cylindrical, rather than frustoconical and the first radial flange portion 126 has a greater axial length and a smaller diameter compared to the first radial flange portion 26 of the fastener element 20 illustrated in FIG. 1. The annular face 128 in this embodiment is preferably dish-shaped or frustoconical because of the method of installation described below.

Figure 5:
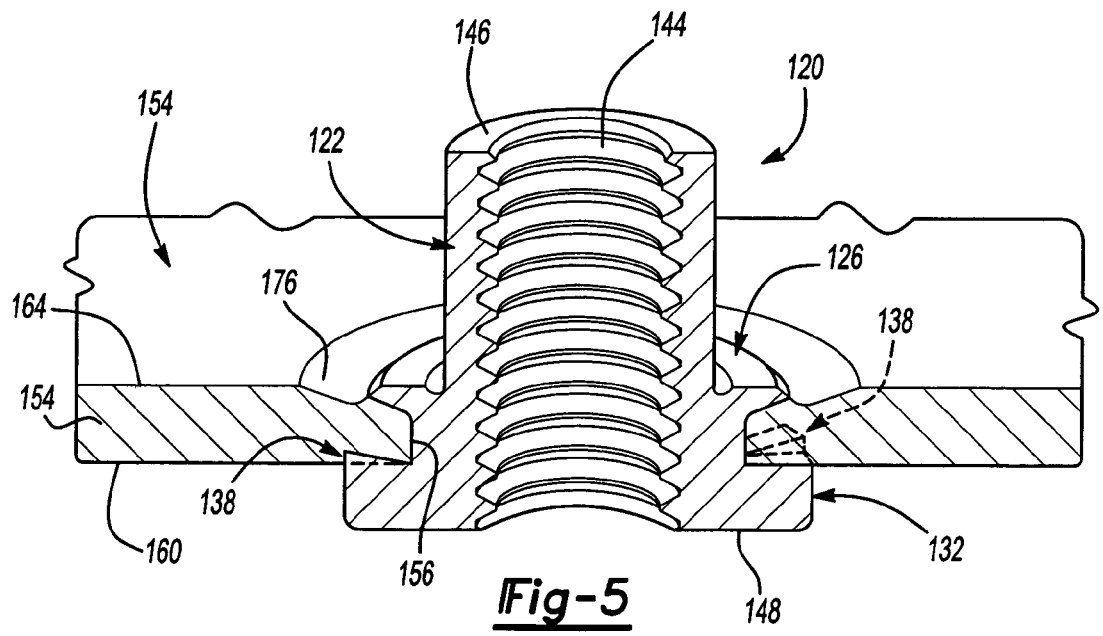
FIG. 5 is a side cross-sectional view of the fastener element illustrated in FIG. 4 following installation of the fastener element in a panel.

The fastener element 120 further includes a second radial flange portion 132 having an annular face 134 surrounding the first radial flange portion 126 which is preferably planar, but may be inclined inwardly toward the first radial flange portion 126 similar to the annular face 128. The annular face 134 of the second radial flange portion includes a plurality of circumferentially spaced radial ribs 138, each having a top face 140 spaced above the plane of the annular face 134 and, in a preferred embodiment, the top faces 140 are inclined radially outwardly from the first radial flange portion 126 as illustrated and described above with regard to the radial ribs 38 of the fastener element 20 illustrated in FIG. 1. The radial ribs further include side faces 142 which, as described above, are inclined outwardly from the top face 140 forming a trapezoidal-shape in cross-section. In this embodiment, the side face 136 of the second radial flange portion 132 is polygonal having a plurality of side faces 172 and corner faces 174 and the radial ribs 138 are aligned with the corner portions or corner faces 174 as shown in FIG. 4. This embodiment of the fastener element 120 may also include a bore 144 through the annular end face 146 of the shank or barrel portion 122 and the bore extends through the first and second radial flange portions 126 and 132, respectively, as shown in FIG. 5. The axial bore 144 may be internally threaded as shown, or the bore 144 may be smooth and cylindrical to receive a thread forming or thread rolling male fastener as described above. The annular end face 148 of the second radial flange portion 132 is also preferably planar to receive a plunger during the installation of the fastener element 120 as described above with regard to FIGS. 2 and 3.

FIG. 5 illustrates a fastener and panel assembly of this invention which may be formed by the method of installing a fastener element 120 of this invention into a panel 154. As shown in FIG. 5, the first radial flange portion 126 has been deformed radially outwardly and against the second face 164 of the panel 154, forming an annular recess 176 surrounding the second radial flange portion 126, such that the second radial flange portion 126 is flush with the face 164 of the panel 154.

FIGS. 6 to 10 illustrate one preferred embodiment of the method of installing the fastener element 120 in a panel 154 as shown in FIG. 5 and the sequence of installation. As set forth above, the fastener elements of this invention may be installed in a conventional die press (not shown) which includes an installation head (not shown) typically in the upper die member having a reciprocating plunger 150 and a die member or die button 152 typically in the lower die member of the die press. An opening 156 is formed in the panel 154 having a diameter generally equal to or slightly greater than the diameter of the outer surface 130 of the first radial flange portion 126 and less than the diameter of the outer surface 136 of the second radial flange portion 132. The panel 154 is then supported in the lower die member of the die press (not shown) on the die button 152, with the opening 156 through the panel 154 coaxially aligned with the opening 158 through the die button 152 as shown in FIG. 6. The die button 152 includes an annular outer projecting die lip 162 opposite the second face 164 of the panel 154 as described above with respect to FIG. 2. However, in this embodiment of the installation tooling, the die button 152 also includes an inner annular lip 163 having a diameter and configured to be received in the dish-shaped or frustoconical annular face 128 of the first radial flange portion 126 as shown in FIG. 6. Following alignment of the cylindrical shank or barrel portion 122 with the opening 158 through the die button 152, the plunger 150 drives the cylindrical shank or barrel portion 122 and the first radial flange portion 126 through the opening 156 in the panel 154 and the cylindrical shank or barrel portion 122 is then received in the cylindrical opening 158 in the die button 152 as shown in FIG. 6.

Figure 8:
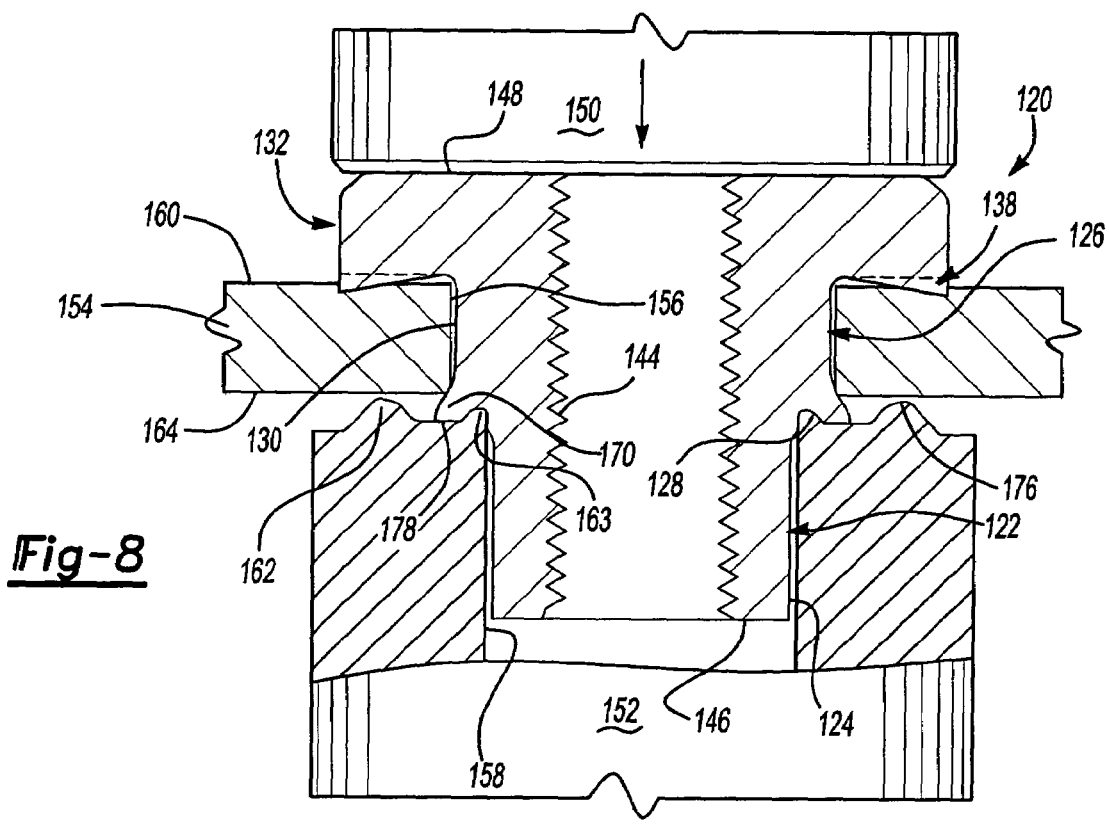
Figure 9:
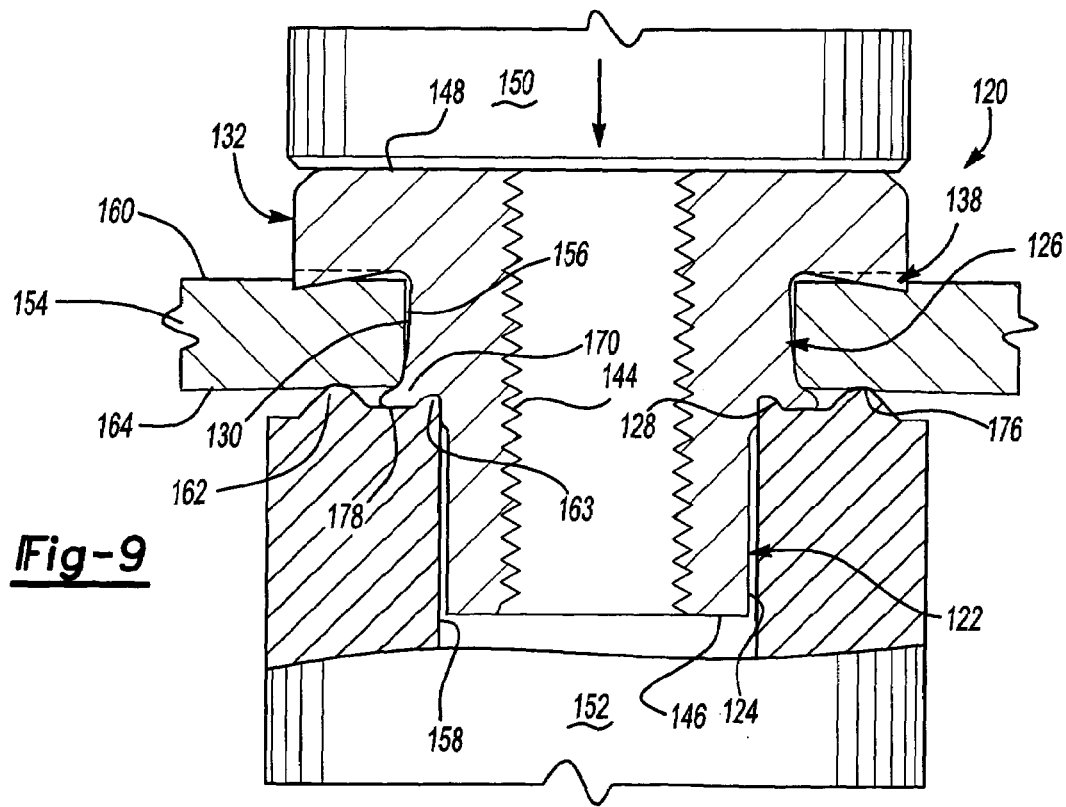
Figure 10:
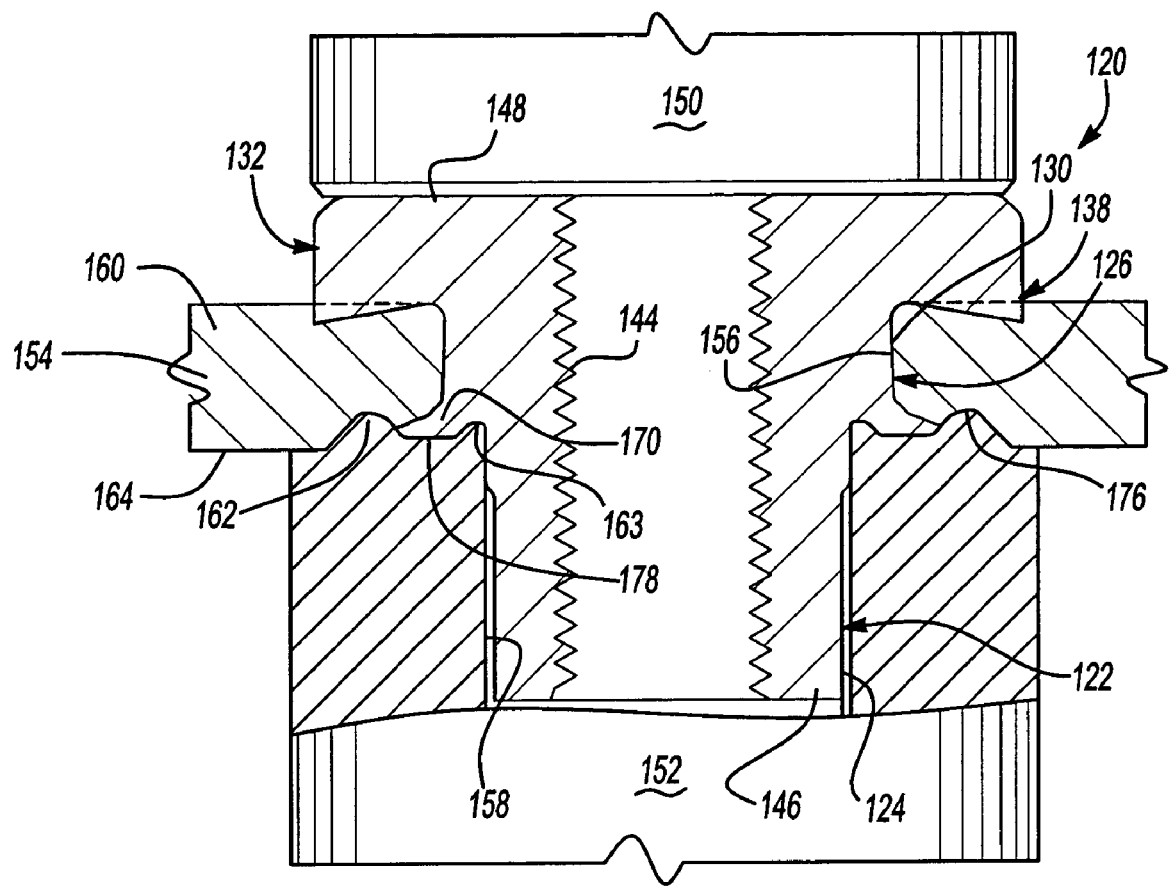

As shown in FIG. 7, the first inner annular die lip 163 is initially received in or against the frustoconical annular face, deforming a portion 170 of the first radial flange portion 126 radially outwardly to overly the second face 164 of the panel 154 as shown in FIG. 7. As the plunger 150 is driven by the upper die shoe (not shown) toward the die button 152, the first inner annular lip 163 deforms the annular portion 170 radially, as shown in FIGS. 8 and 9 until the second outer annular die lip 162 engages the face 164 of the panel 154 as shown in FIG. 9. Finally, the second outer annular die lip 162 is driven into the face 164 of the panel as shown in FIG. 10, deforming the panel 154 adjacent the panel opening 156 radially inwardly, as shown in FIG. 10, and the annular lip 170 of the first radial flange portion 126 is simultaneously driven against the panel by the annular die face 178 surrounding the inner and outer die lips 163 and 162, respectively, as shown in FIG. 10. Simultaneously, the radial ribs 138 are driven into the face 160 of the panel 154. As will be understood from the above description of the method of installation and the fastener element 120 and panel assembly shown in FIG. 5, the fastener and panel assembly shown in FIG. 5 has a significantly improved integrity over the fastener and panel assembly illustrated in FIG. 3, particularly pull-out strength. As set forth above, the fastener elements 20 and 120 may be male fastener elements, wherein the outer surface 24 and 124 of the shank or barrel portion 22 or 122 may be externally threaded. The improved integrity of the joint illustrated in FIG. 5 will also have advantages in a male fastener, improving the resistance to tilting of the shank or barrel portion 122 during side and torque loads.

As will be understood by those skilled in this art, various modifications may be made to the fastener elements, method of assembly and the fastener and panel assembly of this invention within the purview of the appended claims. For example, as set forth above, the fastener and method of assembly disclosed herein may be utilized for a male fastener, wherein the shank or barrel portion 22, 122 may be externally threaded. Further, the external surfaces of the shank or barrel portion 22, 122, the first radial flange portion 26, 126 and the second radial flange portion 32 and 132 will depend upon the application. For example, in the method of attaching the fastener 20 shown in FIGS. 2 and 3, the outer surface 30 of the first radial flange portion 26 may include a lip or a radial portion which overlies the annular face 34 of the second radial flange portion 32, rather than a frustoconical surface. Further, the annular face 28 of the first radial flange portion may be perpendicular to the longitudinal axis A, rather than frustoconical. Finally, although the annular surface 134 of the second radial flange portion 132 surrounding the first radial flange portion 126 is preferably dish-shaped to receive the first inner annular lip 163 of the die button 152, the annular face 134 may be any suitable configuration including cylindrical in cross-section. Having described the preferred embodiments of this invention, the invention is now claimed as follows.

The invention claimed is:

1. A method of attaching a fastener element to a panel, said fastener element including a shank portion, a first radial flange portion integral with and coaxially aligned with said shank portion having a diameter greater than said shank portion, and a second radial flange portion integral and coaxially aligned with said first radial flange portion having a diameter greater than said first radial flange portion, said second radial flange portion including an annular end face adjacent said first radial flange portion having a plurality of ribs projecting from said annular end face, said method comprising the following steps:

forming an opening in said panel having a diameter at least equal to said diameter of said first radial flange portion and less than a diameter of said second radial flange portion;

inserting said barrel portion and said first radial flange portion through said opening in said panel and locating said annular end face of said second radial flange portion opposite one face of said panel;

driving said annular end face of said second radial flange portion against said one face of said panel and driving said ribs into said one face of said panel, preventing rotation of said fastener element relative to said panel; and driving an annular die surface against an opposed face of said panel, thereby deforming said panel radially inwardly beneath an overlying portion of said second radial flange portion, preventing withdrawal of said fastener element from said panel.

2. The method of attaching a fastener element to a panel as defined in claim 1, wherein said method includes deforming an annular portion of said first radial flange portion surrounding said shank portion radially outwardly.

3. The method of attaching a fastener element to a panel as defined in claim 1, wherein said first radial flange portion includes a frustoconical outer surface extending above said annular end face of said second radial flange portion overlying said second radial flange portion, wherein said method includes driving said projecting annular die surface against said opposed face of said panel and deforming said panel radially inwardly beneath said frustoconical outer surface of said first radial flange portion.

4. The method of attaching a fastener element to a panel as defined in claim 1, wherein said method includes forming a bore through said shank portion and said first and second radial flange portions, thereby forming a female fastener element.

5. The method of attaching a fastener element to a panel as defined in claim 1, wherein said method includes deforming an annular surface of said first radial flange portion radially outwardly forming said overlying portion of said second radial flange portion and simultaneously deforming said panel radially inwardly beneath said overlying portion of said radial flange portion.

6. The method of attaching a fastener element to a panel as defined in claim 5, wherein said method further includes deforming said overlying portion of said second radial flange portion against said panel.

7. The method of attaching a fastener element to a panel as defined in claim 1, wherein said plurality of ribs are circumferentially spaced radial ribs each having a top face inclined upwardly from adjacent said first radial flange portion to an outer surface of said second radial flange portion, said method including deforming said ribs into said opposed face of said panel incrementally from adjacent said outer surface of said second radial flange portion to adjacent said first radial flange portion.

8. A method of attaching a fastener element to a panel, comprising the following steps:
    forming a fastener element having a generally cylindrical shank portion, a first radial flange portion integral and coaxially aligned with said shank portion having an annular face surrounding said shank portion and a frustoconical outer surface inclined inwardly from an outer edge, and a second radial flange portion integral and coaxially aligned with said first radial flange portion having an annular face surrounding said first radial flange portion including a plurality of circumferentially spaced radial ribs each having a top face inclined inwardly from an outer surface of said second radial flange to adjacent said frustoconical outer surface of said first radial flange portion;

forming an opening in said panel having a diameter equal to or greater than a diameter of said first radial flange portion but less than said second radial flange portion;

inserting said shank portion and said first radial flange portion through said opening in said panel and locating said annular face of said second radial flange portion opposite a first face of said panel; and deforming said annular face of said first radial flange portion radially outwardly to overly and engage a second face of said panel, and substantially simultaneously driving said annular face of said second radial flange portion against said first face of said panel and deforming said radial ribs into said first face of said panel, deforming said panel beneath said frustoconical outer surface of said first radial flange portion and preventing rotation of said fastener element relative to said panel.

9. The method of attaching a fastener element to a panel as defined in claim 8, wherein said method includes substantially simultaneously deforming said panel radially inwardly against an outer surface of said first radial flange portion.

10. The method of attaching a fastener element to a panel as defined in claim 8, wherein said method includes deforming said annular face of said first radial flange portion radially outwardly with a die member including a first projecting inner annular die surface aligned with said annular face of said first radial flange portion and a second projecting annular die surface aligned with said annular face of said second radial flange portion opposite said second face of said panel, said method including driving said die member toward said panel, driving said first projecting inner annular die surface against said annular face of said first radial flange portion, deforming a portion of said first radial flange portion radially outwardly to overly said second face of said panel, then driving said second outer annular die surface against said panel, and deforming said panel adjacent said opening radially inwardly, and said first projecting inner annular die surface deforming said portion of said first radial flange portion against said second face of said panel.

11. The method of attaching a fastener element to a panel as defined in claim 8, wherein said method includes forming a bore through said generally cylindrical shank portion and said first and second radial flange portions and internally threading said bore forming a female fastener element.

* * * * *

UNITED STATES PATENT AND TRADEMARK OFFICE
CERTIFICATE OF CORRECTION

| | |
|---|---|
| PATENT NO. | : 7,124,492 B2 |
| APPLICATION NO. | : 10/641566 |
| DATED | : October 24, 2006 |
| INVENTOR(S) | : Stanley E. Wojciechowski et al. |

It is certified that error appears in the above-identified patent and that said Letters Patent is hereby corrected as shown below:

Title Page
    Please note that the number of days for patent term adjustment is 159. Therefore, please delete "160" days and insert --159-- days.

In column 10, line 17, please delete the word "overly" and insert the word --overlie.--

In column 10, line 43, please delete the word "overly" and insert the word --overlie.--

Signed and Sealed this

Sixth Day of March, 2007

JON W. DUDAS
*Director of the United States Patent and Trademark Office*